June 11, 1935.  P. W. DEMPSEY  2,004,652
PROCESS OF MAKING CYLINDER PACKINGS
Filed Oct. 28, 1933  3 Sheets-Sheet 1
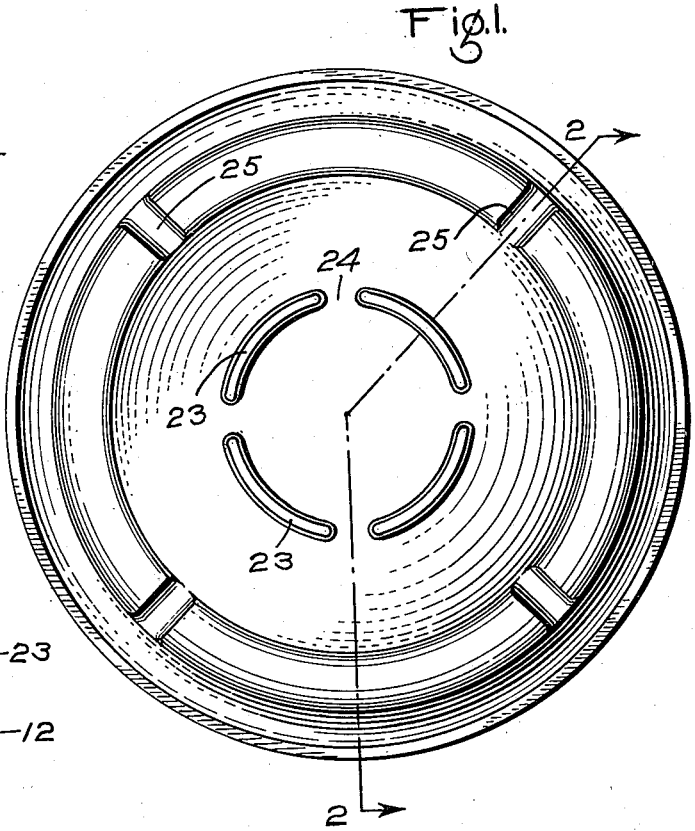
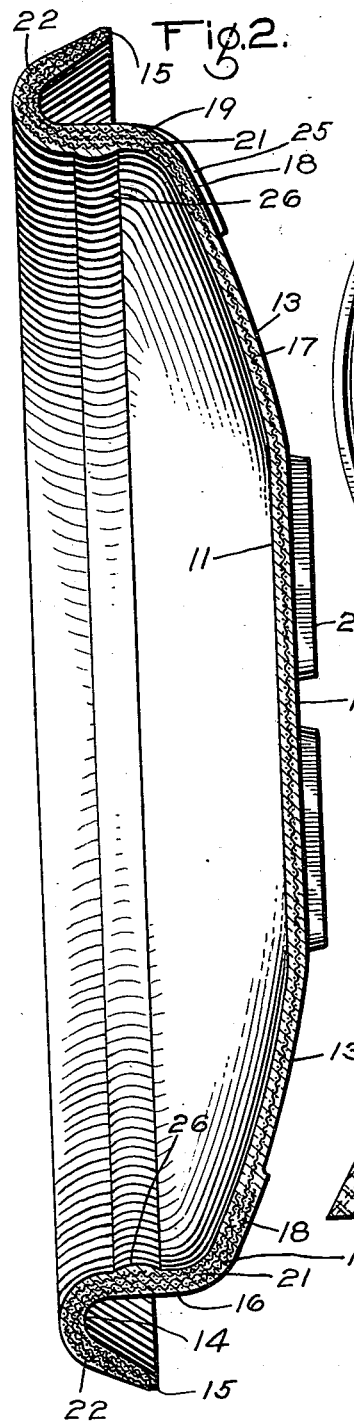
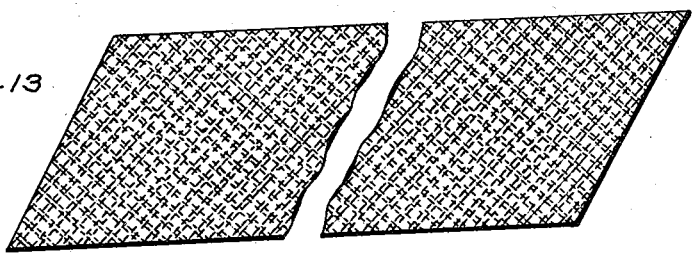
INVENTOR
PHILIP W. DEMPSEY
BY *Wm. M. Cady*
ATTORNEY

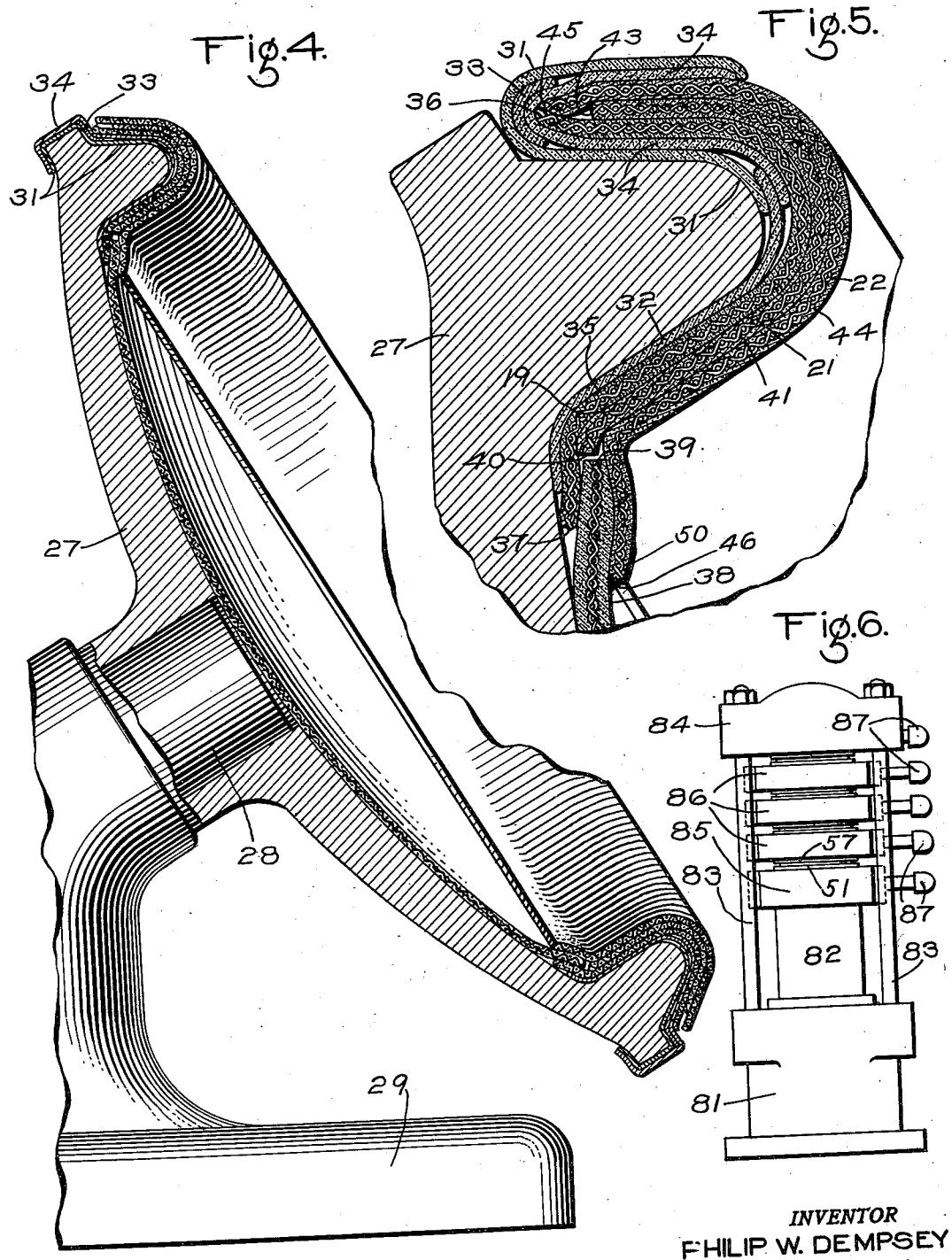

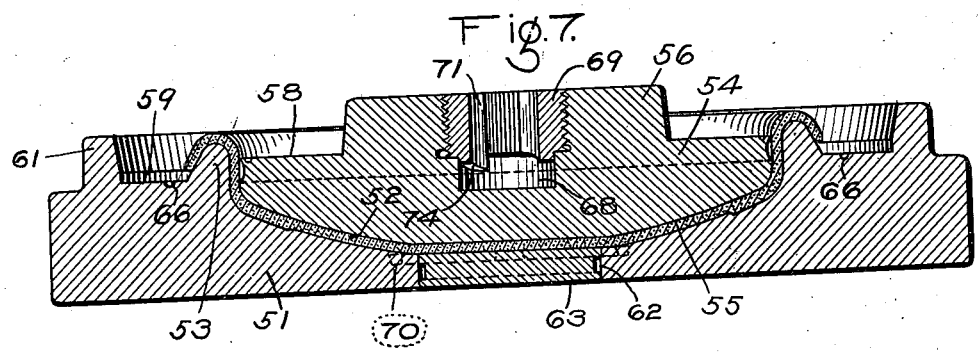
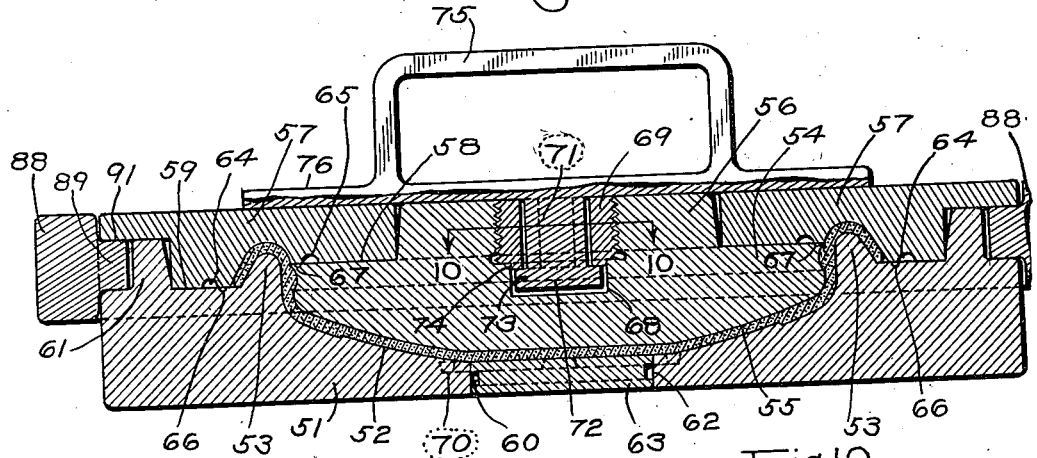
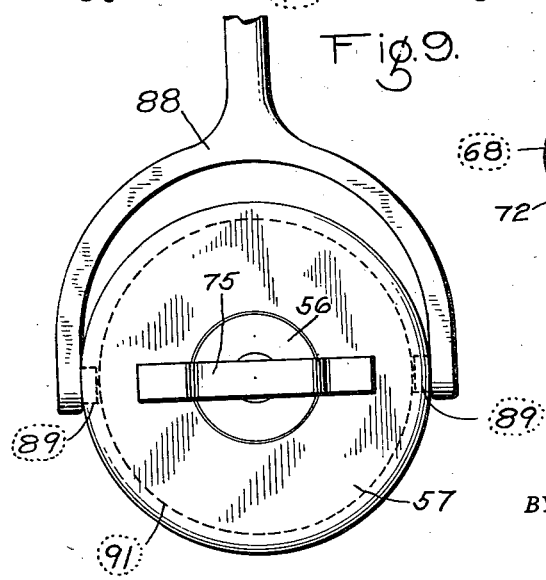
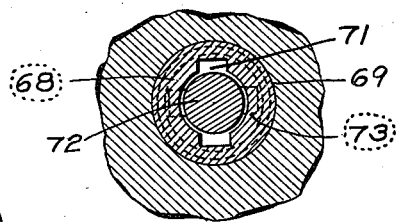

Patented June 11, 1935

2,004,652

UNITED STATES PATENT OFFICE 2,004,652

PROCESS OF MAKING CYLINDER PACKINGS

Philip W. Dempsey, Pittsburgh, Pa., assignor to The Westinghouse Air Brake Company, Wilmerding, Pa., a corporation of Pennsylvania Application October 28, 1933, Serial No. 695,638

7 Claims. (Cl. 18—55)

This invention relates to piston packing and particularly to the method of and apparatus for making reinforced rubber piston packing such as is disclosed in the copending application of Ellis E. Hewitt and William C. Landis, Serial No. 692,099, filed October 4, 1933, assigned to the assignee of this application.

An object of the invention is to provide a method for making reinforced rubber piston packing whereby the reinforcing fabric may be so built into the packing and the rubber compound so distributed with respect to the fabric that the fabric is retained in its proper position and properly covered with rubber in order that the fabric will be completely enveloped during the molding and curing operation.

Another object of the invention is to provide a method of making a reinforced rubber packing having an annular peripheral corrugation, whereby multiple layers of reinforcing fabric may be properly built into the corrugated portion of the packing so that maximum flexibility, strength and resiliency may be obtained and so that the warp and woof strands of the reinforcing fabric throughout the corrugated and peripheral portion of the packing are diagonal to intersecting radii of the packing. This arrangement of the strands of the fabric provides maximum flexibility and resiliency at the peripheral sealing portion of the packing where the distortion thereof is maximum when the packing is pressed and confined within its cylinder.

A further object of the invention is to provide a method of and apparatus for making a reinforced piston packing, whereby the materials of the packing are properly distributed in the blank, and whereby the gases incident to the curing operation and the excess material displaced during the compressing operation are so vented to the exterior of the mold that they do not tend to displace the fabric or interfere with proper distribution of the rubber compound.

A further object of the invention is to provide a method of and apparatus for making a reinforced packing, whereby assembly of the material constituting the blank into a form approximating that of the finished packing is facilitated and whereby the molding operations are simplified.

These and other objects of the invention that will be made apparent throughout the further description thereof are attained by the method of and apparatus for forming piston packing hereinafter described and illustrated in the accompanying drawings; wherein Fig. 1 is a plan view of the outer or convex pressure face of a piston packing embodying features of my invention;

Fig. 2 is a sectional view of the packing shown in Fig. 1, taken on the broken line 2—2 thereof;

Fig. 3 is an elevational view of a fragment of the fabric reinforced rubber sheet strip used in building up the blank such as is subsequently pressed and cured to form the finished packing;

Fig. 4 is a sectional view of a mandrel or arbor upon which the blank is built up, showing a blank in a partial stage of formation;

Fig. 5 is a fragmental enlarged sectional view of the marginal portion of the blank showing the nature and disposition of the materials of a completed blank;

Fig. 6 is an elevational view in reduced scale, of an hydraulic press in which the molds are pressed and heated and held under great pressure during the curing operation;

Fig. 7 is a sectional view of a blank placed within a mold section and with another mold section for confining the central portion of the blank in operative position;

Fig. 8 is a sectional view of the completed cured packing within the complete mold and showing operating tools in position for separating the mold sections for extraction of the finished packing;

Fig. 9 is a plan view of the mold and operating tools shown in Fig. 8; and

Fig. 10 is a fragmental sectional view of a detail of the mold section interlock taken on the line 10—10 of Fig. 8.

Referring to the drawings and particularly to Figs. 1 and 2, wherein a completed packing is disclosed, the packing disc comprises a central portion 11 having a central flat portion 12 surrounded by a portion 13 having a spherical surface or contour which merges into an annular corrugation 14 that terminates in a peripheral or circumferential lip 15 that is adapted to engage the cylinder wall.

The lip portion of the corrugation is flared outwardly at an angle from the cylindrical portion 16 of the corrugation and when the packing is mounted upon a piston, not shown, such as disclosed in the above noted copending application, the lip portion 15 is compressed inwardly so that it is substantially parallel with the wall portion 16 of the corrugation, the material in the U-bend portion of the corrugation being then under pressure and tension, so that when the packing is in place within the cylinder, the resiliency of the material in the U-bend portion of the corrugation tends to force the lip portion 15 outwardly into firm contact with the cylinder wall and will continue to so press the lip portion into effective contact with the cylinder wall regardless of reduction in thickness of the lip portion due to wear. As a result of this construction the life of the packing is materially increased.

As shown in Fig. 2, the central portion 11 of the packing is reinforced by a layer of woven fabric 17 which is embedded within the rubber compound and which terminates circumferentially at the point 18, a slight distance from the point at which the central portion 11 merges into the curved corrugated portion of the packing.

As indicated in Fig. 2, the curved corrugated portion of the packing is reinforced by three layers of reinforced material, the inner layer 19 comprising a strip of fabric, such as is shown in Fig. 3, so disposed that the warp and woof strands of the fabric, when the latter are in place within the packing, are diagonal to the intersecting radii throughout the circumference of the packing disc. The strip or band 19 extends from the peripheral lip 15 of the packing inwardly so that it overlaps the marginal edge of the fabric disc 17. The central layer of fabric 21 is similar to the layer 19 and extends from the peripheral edge of the packing inwardly so that its inner edge butts the peripheral edge of the fabric disc 17, the warp and woof strands of the fabric being disposed in the manner of the strip 19. The outer layer 22 of the fabric is similar to the strip 19 and extends from the peripheral lip 15 inwardly so that its inner margin overlaps the peripheral edge or margin of the disc 17 for a greater distance than the layer 19 overlaps the same disc.

It is desirable that the annular, corrugated portion of the packing be extremely flexible and resilient and have great strength. By reason of the arrangement of the outer three layers of fabric so that the warp and woof strands thereof are disposed diagonally to the intersecting radii throughout the circumference of the disc, no strands of the fabric are disposed tangent to the curvature of the corrugation and, therefore, flexibility is provided in every direction in which the corrugation is normally distorted in service. This would not be the case if the layer of fabric 17 were extended to the peripheral lip of the packing, for in such case some strands of either the warp or woof would be tangent to the curvature of the corrugation and rigidity would result, which might occasion failure of the packing under service condition.

It is also important that the central or spherical portion of the packing disc be relatively rigid compared with the corrugated flexible portion of the disc, so that it will maintain its proper shape and adhere closely to the piston upon which the packing is mounted and which is illustrated in the above noted copending application.

The flattened portion 12 of the packing disc is provided with four arcuate stop lugs or bosses 23, which are adapted to engage the pressure head of the cylinder and hold the main body surface of the packing out of contact with the pressure head, so that it will not adhere thereto and so that fluid under pressure entering the cylinder may act upon substantially the entire surface of the packing and flow freely to the corrugated portion thereof.

As indicated in Figs. 1 and 2, the portion of the packing disc which is reinforced by the several layers of fabric is of slightly greater thickness than the central portion 11, and in order to insure that fluid under pressure will flow to the peripheral edge of the packing from the space within the arcuate bosses 23, spaces 24 are provided between the bosses 23 through which fluid under pressure may flow, and grooves 25 are provided in the portion of increased thickness for permitting fluid under pressure to flow to the peripheral edge of the packing in the event that the bosses 23 are compressed sufficiently to permit the portion of increased thickness to engage the pressure head of the cylinder.

As indicated in Fig. 2, an annular bead 26 is provided on the inner face of the packing which is adapted to expand into an annular groove on the piston, not shown, for the purpose of retaining the packing upon the piston as provided for in the piston and packing structure disclosed in the above noted copending application.

The packing illustrated in Figs. 1 and 2, is made by the following process.

Rubber compound is first rolled into a sheet having the desired thickness and then cut into strips having the general form shown in Fig. 3. Rubber compound is also rolled or "frictioned" on to a sheet of wide mesh cotton fabric, so that the layers of rubber on opposite sides of the fabric are united by the rubber pressed into the interstices between the strands of the fabric, the thickness of the rubber compound coating of the fabric depending on whether it is used for the central portion of a blank or the peripheral portion, that for the central portion being relatively thick. The fabric having the thinner coating is then cut into strips, such as shown in Fig. 3, the warp and woof strands running diagonally of the strip. The fabric having the thicker coating is cut into the form of circular discs. The materials thus prepared have a tacky surface, so that contacting surfaces adhere to one another as they are assembled, so as to form a blank which may be placed in a heated mold and pressed and cured into a finished packing.

The operation of building up a blank is as follows. A cast metal mandrel or arbor 27, Fig. 4, is rotatably mounted upon a shaft 28 that is fixed to a support 29 which is adapted to be secured to a work bench, not shown. The arbor is adapted to be rotated by the operator and the blank receiving face thereof is shaped to conform with the contour of the outer or convex face of the blank, so that the blank formed thereon is given a definite shape that will fit readily into the curing mold which will hereinafter be described.

In building up a blank upon the arbor 27, the arbor is first coated with a thin coating of a composition which will prevent permanent adherence of the rubber material to the blank. A strip 31 of raw or uncured rubber compound is then wound about the peripheral edge of the arbor as indicated in Fig. 4. A second strip of raw rubber compound 32 is then wound or laid upon the arbor so that the outer edge thereof overlaps the inner edge of the strip 31, the strips being of such length that the ends thereof slightly overlap when pressed upon the arbor. A relatively narrow strip 33 of raw rubber compound is then wound upon the arbor and superimposed on the strip 31 for the purpose of providing additional rubber stock at a point adjacent the peripheral edges of the reinforced rubber compound strips to be later applied.

A fourth strip of raw rubber compound 34 is then wound upon the mandrel superimposed on the strips 31 and 33 and slightly overlapping the outer peripheral edge of the strip 32. The structure is now ready to receive a strip of reinforced raw rubber compound 35 containing the fabric layer 19, which is superimposed on the strip 34 and the strip 32 so that the outer peripheral edge 36 thereof slightly overlaps the narrow strip 33 and the inner peripheral edge 37 thereof slightly overlaps the edge of the strip 32.

The reinforced rubber compound circular disc 38, having the woven fabric layer 17 coated with a relatively thick layer of raw rubber compound on each side, is then pressed in place upon the arbor so that the peripheral edge 39 thereof overlaps the inner edge 37 of the reinforced strip 35, care being taken to properly center the disc with respect to the inner edge of the strip 35. A second strip 41 of reinforced raw rubber compound containing the fabric layer 21 is next wound upon the arbor, so that it is superimposed on the reinforced strip 35 and so that its inner edge 40 butts the peripheral edge 39 of the disc 38 and so that the outer peripheral edge 43 thereof terminates just short of the peripheral edge 36 of the first reinforced disc 35. A third and final reinforced strip 44 containing the fabric layer 22 is then wound upon the arbor, so that it is superimposed on the strip 41 and so that its outer peripheral edge 45 overlaps the peripheral edge 43 of the second reinforced strip 41 and is substantially flush with the outer peripheral edge 36 of the first reinforced strip 35 and so that the inner peripheral edge 46 overlaps the peripheral edge 39 of the disc 38 and the inner edge 37 of the strip 35 as indicated in Figs. 4 and 5.

The exposed inner edge 46 of the third reinforced strip 44 is then coated with a rubber cement or liquid rubber compound 50, so that the exposed fabric strands are covered with rubber, which will facilitate the flow of the raw rubber compound thereover during the pressing and curing operations to be hereinafter described. The peripheral marginal portions of the rubber compound strips 31 and 34 are next folded over the peripheral edges of the reinforced strips in the manner shown in Fig. 5, to provide an abundant quantity of raw rubber compound stock at the peripheral margin of the blank.

The arbor with the blank adhering thereto is then removed from the shaft 28 and placed on a storage shelf, not shown, where it is allowed to remain for several days exposed to the atmosphere of the room in which the blank was formed for the purpose of permitting volatile liquids contained within the rubber cement and the raw rubber compound to escape and evaporate, so that when the blank is confined within a heating mold, as will hereinafter be described, the formation of blisters is avoided.

After the blank has remained in storage upon the mandrel a sufficient time to become properly dried, it is stripped from the arbor and may then be placed in a curing and shaping mold such as is disclosed in Figs. 7 and 8. The mold employed in giving the packing its final shape and in which the packing is cured comprises a base section 51 having a concave mold surface 52 having the contour of the outer convex face of the finished packing. The mold section 51 is provided with an annular ridge 53 which serves to form the U-bend portion or corrugation of the packing and arcuate grooves 70 for forming the arcuate bosses 23 on the finished packing. The mold also comprises a central section 54 having a convex mold surface 55 having the contour of the central portion of the inner concave face of the packing. The section 54 is provided with a frusto-conical boss 56 which serves as a centering guide for an annular mold section 57, which constitutes the third section of the mold and which is adapted to make metal to metal contact with an annular surface 58 of the section 54 and an annular surface 59 on the mold section 51. An annular flange 61 on the mold section 51 serves also to center the annular mold section 57 and when the three mold sections are in assembled relation, a space is provided between the combined mold sections having the exact contour of the finished packing.

Because of the presence of the annular ridge 53 for forming the corrugation, which prevents gases from flowing past it, it is necessary to provide means through which the gases may be vented from the central portion of the outer face of the packing. The mold section 51 is therefore provided with a central bore 62 that is closed by a plug 63 that closely fits within the bore, the clearance between the mold section and the plug, however, being sufficient to permit gases to escape to the atmosphere through the bore 62. The plug is provided with an annular groove 60 for receiving any excess material flowing through said clearance space.

The mold section 57 is provided with annular grooves 64 and 65, which cooperate respectively with annular groove 66 in the mold section 51 and annular groove 67 in the face 58 of the mold section 54, which grooves constitute overflow grooves for the excess material and which function in the manner disclosed in my Patent No. 1,910,525, issued May 23, 1933. Gases generated within the mold during operation may also escape to the atmosphere through the said grooves and from the space between the contacting surfaces of the mold section.

The central mold section 54 is provided with a recess or bore 68 which is threaded for receiving a screw plug 69 having a key hole slot 71 therein for receiving a key lug 72 having wings 73 thereon adapted to engage arcuate cams 74 which are provided with inclined cam surfaces, which are adapted to engage the wings 73 of the key lug 72 when the operating handle 75 is turned through substantially 45°. The operating handle 75 is provided with wings 76 that extend over the annular mold section 57 and when the key lug 72 is in operative engagement with the arcuate cams 74, the central mold section 54 is drawn into close engagement with the annular mold section 57, so that the mold sections 54 and 57 are connected in order that they may be handled as a unit when it is desired to separate the mold sections 54 and 57 from the mold section 51 for the purpose of removing a finished packing and inserting a blank. The operating handle 75 may be readily detached from the mold sections 54 and 57 by turning the operating handle so that the lugs 73 register with the key slot 71, at which time the operating handle may be withdrawn.

The final molding and curing operation consists in placing round strips or bars of raw rubber compound in the grooves 70 to form the bosses 23 on the finished packing, placing the blank within the mold section 51 as shown in Fig. 7, placing the central mold section 54 in position upon the central portion of the blank and then in placing the annular mold section 57 in assembled cooperating position upon the mold section 51 and the mold section 54. The assembled mold is then placed in an hydraulic press, such as is disclosed in Fig. 6 and which is of well known construction and comprises a base cylinder 81 containing an hydraulic ram or plunger 82 and which supports vertical guides 83 to which a stop head 84 is attached. The plunger 82 is provided with a pressure head 85 and floating platens are mounted within the guides 83 where they are supported for vertical movement. The pressure head 85 and the stop head 84 and the platens 86 are hollow and the chambers therein are supplied with steam through pipes 87 at a pressure of approximately fifty pounds per square inch, for maintaining the temperature of the elements of the press at a temperature of approximately 300° Fahrenheit. Assembled molds containing the blanks are placed between the said heads and the platens and between the platens as indicated in Fig. 6. Hydraulic pressure of many tons is then applied to the plunger 82 and the molds and the blanks contained therein are subjected to great pressure and heated through the medium of said heads and platens for a period approximating fifty minutes, during which time the curing of the raw rubber compound is completed.

After the curing operation has been completed, the hydraulic pressure is released from the plunger 82 and the platens are permitted to separate. The molds are then withdrawn from the press and placed upon a table. A forked tool 88 having lugs 89 is then inserted in the annular groove 91 between flanges of the mold sections 51 and 57 and the lugs 89 are turned by the tool to slightly separate the mold sections 51 and 57. The operating handle 75 is then connected to the central section 54, so that the mold sections 54 and 57 are connected. The operating tool 88 is then moved to again pry the mold sections 51 and 57 apart, carrying the central mold section 54 with the mold section 57. The finished packing adheres to the mold section 54 because of the annular bead 26 and is withdrawn from the mold section 51.

The operating handle 75 is then removed and the annular mold section 57 is then separated from the mold section 55. The corrugation of the finished packing then projects above the upper face of the central mold section 54, permitting the operator to grip the corrugation and strip the packing from the mold section 54. The packing is then completed, except that it contains a slight flash at the points of joinder of the mold sections, which flash is trimmed from the packing by any preferred means such as by shearing.

Packings made under the above specified process are consistently uniform in shape and dimensions and the reinforcing fabric is completely embedded within the rubber compound, so that no portion thereof is exposed. The corrugated annular portion of the packing is tough, flexible and resilient.

While but one method and but one mold construction is shown for making a piston packing, it is obvious that changes may be made in the method and the mold construction without departing from the spirit of the invention and that while the piston packing disclosed is for packing a piston, the packing process may be employed for making other packing where it is desirable to have a flexible peripheral portion.

Having now described my invention, what I claim as new and desire to secure by Letters Patent, is:

1. The method of forming a resilient packing disc which consists in coating reinforcing fabric with raw, plastic, curable substance, forming a circular disc from some of said material, forming a plurality of annuluses from more of said material, joining the inner margin of said annuluses to the margin of said disc in overlapping relationship to form a blank, confining said blank under pressure so as to give it its final form and in applying heat to said blank while so confined for curing it into a resilient one-piece packing.

2. The method of forming a resilient packing disc which consists in coating strands of fibre disposed at an angle to one another with a raw, plastic, adhesive, curable substance, forming a circular disc from some of said material, forming annuluses from other of said material so that said strands are non-tangential to the curvature of said annulus, joining the inner margins of said annuluses to the margin of said disc by overlapping said margins and pressing them together so that they adhere to form a blank, confining said blank under pressure so as to give it its final form and in applying heat to said blank for curing it into a resilient one-piece packing.

3. The method of forming a resilient packing disc having a peripheral annular corrugation which consists in coating reinforcing strands of fibre with a raw, plastic, adhesive, curable substance such as rubber to form a flat sheet thereof, forming a circular disc from some of said material, forming three annuluses from more of said material conforming approximately to the contour of said corrugation, abutting an inner margin of one of said annuluses to the margin of said disc, joining the inner margin of said other two annuluses to the margin of said disc in overlapping relationship to form a blank, confining said blank under pressure so as to give it its final form and in applying heat to said blank while so confined for curing it into a resilient one-piece packing.

4. The method of forming a rubber packing disc which consists in coating reinforcing fabric with raw rubber, forming a circular disc from some of said material, forming annuluses from other of said material, joining said disc and said annuluses by placing an annulus on opposite sides of the disc with the inner margins of the annuluses overlapping the margin of the disc, covering the outer marginal edges of said annuluses with raw rubber, confining the blank so formed under pressure within a mold having the final contour of the packing, and in heating said mold for curing said rubber when the blank is so confined for amalgamating said disc and annuluses into a one-piece packing.

5. The method of forming a rubber packing disc which consists in coating reinforcing fabric with raw rubber, forming a circular disc from some of said material, forming annuluses from more of said material, coating the margins of said disc and annuluses with a rubber cement material, joining said disc and said annuluses by placing an annulus on opposite sides of the disc with the inner margins of the annuluses overlapping the margin of the disc, subjecting the blank thus formed to a drying atmosphere until the cement has dried, then confining the blank under pressure within a mold having the final contour of the packing and in heating said mold for curing said rubber when the blank is so confined for amalgamating said disc and annuluses into a one-piece packing.

6. The method of forming a rubber packing disc which consists in coating reinforcing fabric with raw, tacky rubber, forming a circular disc from some of said material, forming strips from more of said material, forming raw, tacky rubber in sheet form, forming strips of sheet rubber, then forming a blank by laying one or more strips of raw rubber on the marginal edge of a circular retaining surface having the contour of the outer surface of the blank being formed, superimposing a strip of said material over the inner portion of said strips of raw rubber, placing said disc on the retaining surface with its margin overlapping the inner margin of said strips of material, laying a second strip of said material on the first strip so that its inner edge butts the marginal edge of said disc, laying a third strip of said material on the second strip of material with its inner margin overlapping the margin of said disc, then folding the outer portion of said strips of raw rubber over the outer margins of said strips of material, removing the blank from said retaining surface, confining the blank in a mold having the contour of the finished packing and in heating said mold for curing said rubber when the blank is so confined for amalgamating said disc and strips of rubber and material into a one-piece packing.

7. The method of forming a rubber packing disc which consists in coating reinforcing fabric with raw rubber on both sides to form a sheet of material, forming a circular disc from some of said material, forming three strips from more of said material, forming said strips into annuluses, placing one of said annuluses in butt relation to the marginal edge of said disc, joining said disc and annulus by superimposing said other annuluses on opposite sides of the first said annulus so that their inner edges overlap the margin of said disc, and confining the blank so formed in a mold having the final contour of the packing under pressure and in heating said mold for curing said rubber while the blank is so confined for amalgamating said disc and annuluses into a one-piece packing.

PHILIP W. DEMPSEY.